United States Patent [19]

Aagard et al.

[11] 4,141,621
[45] Feb. 27, 1979

[54] THREE LAYER WAVEGUIDE FOR THIN FILM LENS FABRICATION

[75] Inventors: Roger L. Aagard, Richfield; Robert P. Ulmer, Minneapolis, both of Minn.

[73] Assignee: Honeywell Inc., Minneapolis, Minn.

[21] Appl. No.: 822,116

[22] Filed: Aug. 5, 1977

[51] Int. Cl.² ............................................. G02B 5/14
[52] U.S. Cl. ............................. 350/96.12; 156/643; 204/192 P
[58] Field of Search ............... 350/96.11, 96.12, 96.18, 350/96.34, 175 GN, 178, 320; 156/643, 655, 667; 204/192 P, 192 EC

[56] References Cited

U.S. PATENT DOCUMENTS

| 3,614,198 | 10/1971 | Martin et al. | 350/96.18 |
|---|---|---|---|
| 3,640,807 | 2/1972 | Van Dijk | 204/143 GE |
| 3,655,540 | 4/1972 | Irvin | 204/143 GE |
| 3,743,962 | 7/1973 | Rosenberg | 350/96.12 X |
| 3,758,830 | 9/1973 | Jackson | 317/234 R |
| 3,820,871 | 6/1974 | Croset et al. | 350/96.12 |
| 3,853,650 | 12/1974 | Hartlaub | 156/13 |
| 3,867,148 | 2/1975 | O'Keeffe et al. | 156/643 X |
| 3,917,384 | 11/1975 | Harper et al. | 350/96.12 X |

OTHER PUBLICATIONS

Ulrich et al., "Geometrical Optics in Thin Film Light Guides", Applied Optics, vol. 10, No. 9, Sep. 1971, pp. 2077-2085.
Righini et al., "Geodesic Lenses for Guided Optical Waves", Applied Optics, vol. 12, No. 7, Jul. 1973, pp. 1477-1481.
Aagard, "Optical Waveguide Characteristics of . . . Niobium Pentoxide Films", A.P.L., vol. 27, No. 11, Dec. 1975, pp. 605-607.
Aagard, "Three-Layer Optical Waveguide for . . . Thin-Film Lenses, ", J. Vac. Sci. Technol., vol. 14, No. 1, Jan.-Feb. 1977, pp. 275-277.

Primary Examiner—John K. Corbin
Assistant Examiner—John D. Lee
Attorney, Agent, or Firm—Omund R. Dahle

[57] ABSTRACT

In thin film optical systems including thin film optical waveguides, of such materials as $Nb_2O_5$, it is desirable to fabricate thin film lenses. One of the types of lenses which can be made is the step-in-thickness type. This type of thin-film lens can be fabricated by plasma etching through a photoresist mask in such materials as $Nb_2O_5$ and $Ta_2O_5$. Plasma etching yields an etch wall with smooth steep sides which is important for good quality thin-film lenses; however, the etch rate is too variable for reproducible etch depth based upon etch time, and the bottom of the etch is very rough, causing excessive scattering loss. It has been found that a sandwich-like structure of $Nb_2O_5$, $TiO_2$ and $Nb_2O_5$ provides an improved arrangement in that a good control of the etch depth and a smooth flat bottom in the etch areas have been achieved by introducing the layer of $TiO_2$ as an etch stop.

9 Claims, 3 Drawing Figures

THREE LAYER WAVEGUIDE FOR THIN FILM LENS FABRICATION

BACKGROUND AND SUMMARY OF THE INVENTION

Integrated optics technology is becoming increasingly refined and with the advent of thin film optical systems, it has become desirable to fabricate thin film lenses. The step-in-thickness type of thin film lens is very nearly the equivalent of a conventional cylindrical lens, only in thin form. This type of thin film lens can be fabricated using photolithographic processes by plasma etching through a photoresist mask in such optical waveguide materials as $Nb_2O_5$ and $Ta_2O_5$. A good quality of the plasma etching process is that plasma etching through a photoresist mask results in an etch wall with steep smooth sides. A limitation of this approach, however, is that the etch rate is too variable for reproducible etch depth based upon etch time and the bottom of the etched area is very rough causing excessive scattering loss.

In the present invention a three layer optical waveguide is provided by introducing a layer of $TiO_2$ intermediate two main layers of $Nb_2O_5$. Although both $Nb_2O_5$ and $Ta_2O_5$ are good waveguide materials in this invention, $Nb_2O_5$ is preferred over $Ta_2O_5$ because its refractive index is greater. A good control of the etch depth and a smooth flat bottom in the etch areas have been achieved by the layer of $TiO_2$ acting as an etch stop.

DESCRIPTION OF THE PREFERRED EMBODIMENT

Described below is a three layered thin-film optical system comprising a layered waveguide and thin-film lenses fabricated in the waveguide. More generally, a single mode waveguide is used which has a thickness somewhat less than the thickness for which the second mode would propagate. Into this waveguide is etched a region that has the shape of the cross section of a conventional lens. In the thin-film optics described herein, however, as contrasted with a conventional lens, a convex lens diverges the light and a concave lens converges the light.

Figure 3:
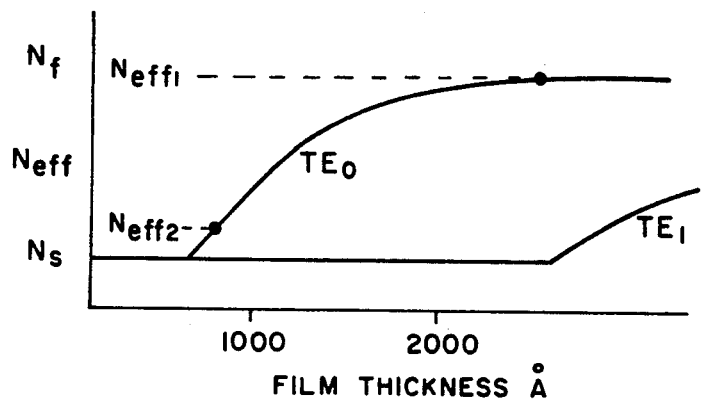
FIG. 3 is a graph of the effective refractive index of a thin film waveguide as a function of thickness.

A lens requires a source of refraction, of course. In a thin film lens it is achieved by changing the thickness of the waveguide. The condition for waveguiding is given by $$KNIW\cos\theta_1 - \theta_{10} - \theta_{12} = m\pi$$

where $K = 2\pi/\lambda o$, $\lambda o$ being the wavelength, $NI$ = film refractive index, $W$ = waveguide thickness, $\theta$ = angle of propagation to the normal to the substrate surface, $\theta_{10}$ and $\theta_{12}$ = phase shift on reflection and m is an integer. When this equation is satisfied a traveling wave mode is established between the upper and lower surface of the waveguide. This mode travels an optical path length of $WNI\sin\theta_1$ for each bounce along the waveguide. Therefore, the quantity $NI\sin\theta_1$ is an effective refractive index imposed by the waveguide thickness $W$. The effective refractive index (representing the propagation velocity along the waveguide) for a thin film waveguide is illustrated in FIG. 3.

The light wave in a thin-film optical system is confined to the waveguide, so that the refractive index can be either higher or lower outside the optical element (i.e. lens) depending upon the choice of waveguide thickness. One of the everpresent problems in thin-film optics in the waveguide loss. It is usually higher than desirable and special care must be exercised to hold the waveguide loss to a minimum. Waveguide loss depends upon the thickness inversely. From the standpoint of minimum waveguide loss, it is best to have the thick portion of the waveguide occupy the largest part of the length of the optical system. Hence, for the designs to be considered the optical components will have a lower refractive index than the surrounding media. The general strategy for choosing the materials in this invention is to use a very high refractive index film and a very low refractive index substrate.

Figure 1:
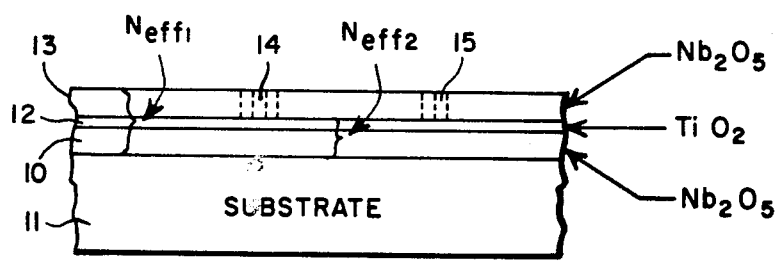
FIG. 1 is an edge view of the layered optical waveguide construction.

Referring now to FIG. 1 there is disclosed an edge view of the layered waveguide construction which generally comprises a thin layer of $TiO_2$ about midway through the $Nb_2O_5$, which $TiO_2$ serves as an etch stop during plasma etching of lenses in the waveguide. These films are deposited on a substrate of glass or quartz. Titanium dioxide provides a good match for the refractive index of the $Nb_2O_5$ while introducing only a small amount of propagation loss. The etch rate for $Nb_2O_5$ in freon gas in a commercial plasma etcher is more than 100 times faster than for $TiO_2$, therefore, by placing a layer of $TiO_2$ in the waveguide by sputter deposition the etch can be stopped at the correct depth. In FIG. 1 a layer of film 10 of $Nb_2O_5$ is deposited on a substrate 11 followed by the depositing of a layer or film 12 of $TiO_2$ finally another layer 13 of $Nb_2O_5$ over the $TiO_2$. In one successful series of laboratory experiments of this invention, films of $Nb_2O_5$ and $TiO_2$ were deposited by dc reactive sputtering from a metallic target in an MRC model 8500 sputtering module containing a mixture of argon and oxygen. A concentration of 90% argon and 10% oxygen at a pressure of $22\mu m$ Hg produced $Nb_2O_5$ films with the least propagation loss. Films of 2500 Å thickness appropriate for single mode thin-film lenses typically have a propagation loss (at 6328-Å laser wavelength) of about 2dB/cm.

A series of depositions of $TiO_2$ were made to determine the deposition rate and refractive index. These films were measured with an ellipsometer to determine the thickness and refractive index at 6328 Å. These films were prepared with 50/50 argon-oxygen. A pressure of $40\mu m$ Hg produced a refractive index of about 2.0, which was considered satisfactory for these experiments.

Another series of films was prepared with constant total thickness of $Nb_2O_5$ and variable thickness of $TiO_2$. The propagation loss was measured in these films by measuring the scattered light at two points along the waveguide and computing the loss in DB/cm. Typical thicknesses for the waveguide layers are for $Nb_2O_5$ layer 10, from about 750 to about 1900Å, for $TiO_2$ layer 12, from about 100 to about 120Å, and for $Nb_2O_5$ layer 13, from about 200 to about 1300Å. This provides for adjusting the refractive index over the full range provided by the materials used. In one specific embodiment layer 10 was 1000Å, layer 12 was 120Å, and layer 13 was 1300Å. Film thicknesses of this order are required because of the way that thin-film lenses are designed. A graph of the effective refractive index of a thin film waveguide as a function of thickness is shown in FIG. 3. Typical useful range of $N_{eff}$ is from slightly greater than substrate value to just below the thickness at which $TE_1$ mode can propagate. A similar set of values can be specified for the TM mode. In order to achieve the desired $N_{eff}$, the lens shaped area left exposed in the photo mask must be etched to a precise depth which is controlled by the $TiO_2$ stop etch layer 12.

Figure 2:
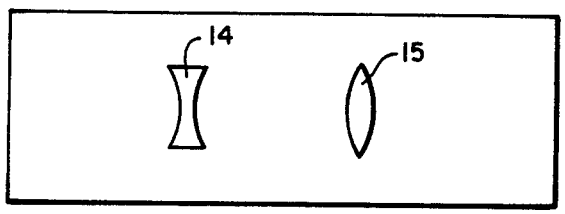
FIG. 2 is a top view of the photomasked waveguide.

FIG. 2 is a top view of the layered waveguide of FIG. 1 and has had lenses 14 and 15 etched through a photoresist pattern laid over the surface on the $Nb_2O_5$ top layer 13. As is shown in dotted lines in FIG. 1, the etch for the lenses 14 and 15 has proceeded down through the layer 13 and bottomed at $TiO_2$ layer 12. The remaining thickness of the waveguide in the lens area is shown as $N_{eff2}$ in FIG. 1 while the overall thickness of layers 10, 12 and 13 is shown as $N_{eff1}$.

In a series of experiments the etch characteristics of these waveguides were investigated by etching through a photoresist lens pattern on each waveguide for the same length of time. Plasma-etch conditions were 5-W rf power, at 0.4 Torr (53.2Pa) in a mixture of 8.4% freon ($CF_4$) 1% oxygen, and the remainder argon for a period of 9 min. The thickness of the $Nb_2O_5$ above the $TiO_2$ was 1200Å. Therefore, about a 50% overetch would occur if the $TiO_2$ was 800Å. This is just above the cutoff thickness for the waveguide. When the etch passed through the $TiO_2$ layer, light propagating in the waveguide would be stopped at the edge of the lens. By this method of observation, a thickness of 120Å was found to be sufficient to withstand the 9-min etch. Introduction of the $TiO_2$ layer for stop-etch purposes causes an increase in waveguide loss and also affects some of the other propagation characteristics. Therefore, the $TiO_2$ must be kept as thin as possible and still provide effective stop-etch characteristics.

Etch time was further refined with a series of waveguides having 100Å $TiO_2$. Photoresist masks were again applied, having the same radius of curvature. The lens focal length depended upon the effective refractive index of the waveguide in the etch region. This depends upon the etch depth. The waveguide was prepared to have a refractive index of 2.0 and the $TiO_2$ layer was located at a depth at which the effective refractive index is 1.65 at 6328Å. This would yield a design focal length of 3.5 mm. The etch time was varied and the focal length of the lens was measured with a traveling microscope. When the etch was not controlled by the $TiO_2$, the focal lengths were random and more than the design value. When the etch was controlled by the $TiO_2$, a reproducible focal length could be achieved. The focal length was 3.8 instead of 3.5 mm, which is somewhat greater than the design value, but the reproducibility for etch times greater than 7 min. is quite good.

Thus, we have shown that plasma etching of a dielectric waveguide to make thin-film lenses, provides straight and smooth sides on the etch portion and by introducing a thin stop etch layer in the waveguide a smooth flat bottom on the etch area is obtained.

The embodiments of the invention in which an exlusive property or right is claimed are defined as follows:

1. A thin film lens fabricated in a layered optical waveguide comprising:

a multilayer optical waveguides comprising a first thin flim layer of ($X_2O_5$) on a substrate, an intermediate thin of titanium dioxide ($TiO_2$) thereon, and a second thin film layer of ($X_2O_5$) over the $TiO_2$, wherein X is an element selected from the group consisting of niobium and tantalum, the three layers together defining a waveguide, and the extremities of the first and second layers of ($X_2O_5$) providing a top and bottom boundary of the waveguide whereby a wave is propagated by reflection between said top and bottom boundaries; and a step-in-thickness lens in said waveguide formed by plasma etching away the desired lens shape in said second ($X_2O_5$) layer, said $TiO_2$ operating as an etch stop during etch to provide a flat bottom for said etching away lens and, therefore, provide a flat top boundary for said lens formed by said remaining first and intermediate layer, whereby in said lens area the wave is propagated by reflection between said lens top boundary and said bottom boundary.

2. The invention according to claim 1 wherein x is niobium.

3. The invention according to claim 1 in which the sum thickness of said three layers is less than the thickness at which the $TE_1$ mode can propagate so that only the $TE_o$ mode propagates.

4. The invention according to claim 1 wherein the first thin-film layer is from about 750 to about 1900 Å in thickness, the intermediate layer of $TiO_2$ is from about 100 to about 120 Å in thickness, and the second thin-film layer is from about 200 to about 1300 Å in thickness.

5. The invention according to claim 1 wherein the first thin film layer is about 800 Å in thickness, the intermediate layer of $TiO_2$ is about 120 Å in thickness and the second thin film layer is 1300 Å in thickness.

6. A thin film lens fabricated in a niobium pentoxide thin film waveguide in which waveguide the index of refraction is related to the film thickness, comprising;

a thin film waveguide on a substrate made up of two thin film layers of niobium pentoxide $Nb_2O_5$ plus a thin film layer of titanium dioxide $TiO_2$ between said two layers, the total thickness of said three layers establishing the effective refractive index of said waveguide; and, a step-in-thickness lens in said waveguide, said lens formed by having plasma etched away the desired lens shape in said second $Nb_2O_5$ layer, said $TiO_2$ operating as an etch stop during etch to provide a flat bottom for said etched away area and, therefore, provide a flat top boundary for said lens formed by said remaining first and intermediate layer, the total thickness of said first $Nb_2O_5$ layer and the $TiO_2$ layer establishing the effective refractive index of said lens.

7. A triple layered thin film optical waveguide for thin film lens fabrication comprising:

a first thin film layer of niobium pentoxide ($Nb_2O_5$) on a substrate, an intermediate thin film layer of titanium dioxide ($TiO_2$) thereon, and a second thin film layer of $Nb_2O_5$ over the $TiO_2$, the three layers together defining a waveguide, the total thickness of said three layers establishing the effective refractive index of said waveguide, the total thickness of said three layers being less than the thickness at which the $TE_1$ mode can propagate so that only the $TE_o$ mode can propagate, and the total thickness of said first and intermediate layers being sufficiently great that the effective index of refraction of said first and intermediate layers exceeds the cutoff thickness for the waveguide.

8. A method for preparing a thin film lens in a thin film optical waveguide comprising:
   providing a first thin film layer of optical $X_2O_5$ on a substrate;
   providing an intermediate thin film layer of optical titanium dioxide ($TiO_2$) on said first layer;
   providing a second thin film layer of optical $X_2O_5$ on said intermediate layer, wherein x is an element selected from the group consisting of niobium and tantalum, said three layers comprising an optical waveguide;
   providing a photoresist mask over the waveguide, the mask including a desired lens shape,
   etching away by plasma etch in the second $X_2O_5$ layer the masked lens shape, the $TiO_2$ layer beneath providing an etch stop;
   whereby the remaining first and intermediate layers beneath the etch provide the desired lens.

9. The method according to claim 8 wherein the first thin film layer is about 800 Å in thickness, the intermediate layer is about 120 Å in thickness, and the second thin film layer is about 1300 Å in thickness.

* * * * *